US009733101B2

(12) United States Patent
Fund et al.

(10) Patent No.: US 9,733,101 B2
(45) Date of Patent: Aug. 15, 2017

(54) VEHICLE CONVERGENCE ANALYSIS BASED ON SPARSE LOCATION DATA

(71) Applicant: International Business Machines Corporation, Armonk, NY (US)

(72) Inventors: Robert J. Fund, Tucson, AZ (US); William J. Oliver, Tucson, AZ (US); Wojciech J. Wyzga, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/714,467

(22) Filed: May 18, 2015

(65) Prior Publication Data
US 2016/0341566 A1 Nov. 24, 2016

(51) Int. Cl.
*G01C 21/34* (2006.01)
*G06K 9/00* (2006.01)
(Continued)

(52) U.S. Cl.
CPC ......... *G01C 21/3667* (2013.01); *G06K 9/325* (2013.01); *G06F 17/3082* (2013.01); *G06K 9/00771* (2013.01)

(58) Field of Classification Search
CPC ............... G06K 9/00536; G06K 9/325; G06K 9/00771; G08B 23/00; G08G 1/017; G01C 21/3667; G06F 17/3082
(Continued)

(56) References Cited

U.S. PATENT DOCUMENTS 8,577,390 B2 11/2013 Sheha et al.
8,768,009 B1 * 7/2014 Smith ............... G06F 17/30241
340/937
(Continued)

FOREIGN PATENT DOCUMENTS

CN 102073691 A 5/2011
JP 2006024194 A * 1/2006
JP 2008032563 A 2/2008

OTHER PUBLICATIONS

Hofleitner et al., "Optimal Decomposition of Travel Times Measured by Probe Vehicles Using a Statistical Traffic Flow Model," 14th International IEEE Conference on Intelligent Transportation Systems, Oct. 5-7, 2011, p. 815-821, IEEE, Washington, DC, USA.
(Continued)

*Primary Examiner* — Isaac Smith
(74) *Attorney, Agent, or Firm* — Michael O'Keefe (57) ABSTRACT

A method for vehicle convergence analysis based on a plurality of sparse location data is provided. The method may include obtaining a plurality of vehicle location data. The method may also include receiving a plurality of input data. The method may further include calculating, for each vehicle a probabilistic street network route based on each sequential piece of timed data and each piece of location data included in the obtained plurality of vehicle data and the received plurality of input data. The method may include identifying a plurality of overlapping routes between two vehicles based on the calculated probabilistic street network route. The method may include displaying the identified plurality of overlapping routes between the two vehicles as a meeting area.

20 Claims, 8 Drawing Sheets

(51) Int. Cl.
*G01C 21/36* (2006.01)
*G06K 9/32* (2006.01)
*G06F 17/30* (2006.01)

(58) Field of Classification Search
USPC .................. 701/117, 410; 340/937; 382/105
See application file for complete search history.

(56) References Cited

U.S. PATENT DOCUMENTS

| | | | |
|---|---|---|---|
| 2008/0071465 A1* | 3/2008 | Chapman | G01C 21/3691 701/117 |
| 2009/0017803 A1 | 1/2009 | Brillhart et al. | |
| 2012/0166080 A1* | 6/2012 | Hung | G08G 1/0175 701/448 |
| 2012/0226390 A1* | 9/2012 | Adams | G07C 5/008 701/1 |
| 2013/0342346 A1* | 12/2013 | Hazzani | G08B 23/00 340/539.13 |
| 2014/0148999 A1 | 5/2014 | Goudy et al. | |
| 2014/0308978 A1 | 10/2014 | Herz et al. | |
| 2014/0376778 A1 | 12/2014 | Muetzel et al. | |
| 2015/0187211 A1* | 7/2015 | Hahn | G08G 1/012 701/117 |
| 2016/0034477 A1* | 2/2016 | Mao | G06F 17/3082 386/353 |
| 2016/0148072 A1* | 5/2016 | Chan | G06K 9/00536 382/104 |

OTHER PUBLICATIONS

IBM, "A System and Method for Multi-Sensor Vehicle Recognition," An IP.com Prior Art Database Technical Disclosure, Jun. 9, 2008, p. 1-4, IP.com No. 000171435.

Mell et al., "The NIST Definition of Cloud Computing," National Institute of Standards and Technology, Sep. 2011, p. 1-3, Special Publication 800-145.

Zheng et al., "Urban Link Travel Time Estimation Based on Sparse Probe Vehicle Data," Transportation Research, Jun. 2013, p. 145-157, Part C: Emerging Technologies, vol. 31C, Elsevier Ltd.

* cited by examiner

200 — Inverse Convergence Analysis

VEHICLE CONVERGENCE ANALYSIS BASED ON SPARSE LOCATION DATA

BACKGROUND

The present invention relates generally to the field of computers, and more particularly to sparse data.

Sparse data is a term used to describe information coming from sensors or other non-information technology (IT) devices. Sparse data may be for example, a sensor recording the temperature and humidity levels, or how often something is used. When the sensor reports that data, it may be just a small amount of information within the overall structure. Sparse data almost always goes one way, from the sensor to the network. Although it may be just a bit of data now, in the future, there may be many more of these devices, and in unique areas.

SUMMARY

According to one embodiment, a method for vehicle convergence analysis based on a plurality of sparse location data is provided. The method may include obtaining a plurality of vehicle location data, whereby the received plurality of vehicle data includes a location associated with a vehicle, a license plate text associated with the vehicle, and a date and time of a sighting of the vehicle. The method may also include receiving a plurality of input data, whereby the plurality of input data includes at least two license plates that are associated with at least two vehicles, whereby each license plate is associated with a different vehicle, an indicated time span on which to run an analysis on the obtained plurality of vehicle location data, and an indicated time difference between an actual route and an estimated route. The method may further include calculating, for each vehicle associated with the at least two license plates, a probabilistic street network route based on each sequential piece of timed data and each piece of location data included in the obtained plurality of vehicle data and the received plurality of input data. The method may include identifying a plurality of overlapping routes between the at least two vehicles associated with the at least two license plates based on the calculated probabilistic street network route. The method may include displaying the identified plurality of overlapping routes between the at least two vehicles as a meeting area.

According to another embodiment, a computer system vehicle convergence analysis based on a plurality of sparse location data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include obtaining a plurality of vehicle location data, whereby the received plurality of vehicle data includes a location associated with a vehicle, a license plate text associated with the vehicle, and a date and time of a sighting of the vehicle. The method may also include receiving a plurality of input data, whereby the plurality of input data includes at least two license plates that are associated with at least two vehicles, whereby each license plate is associated with a different vehicle, an indicated time span on which to run an analysis on the obtained plurality of vehicle location data, and an indicated time difference between an actual route and an estimated route. The method may further include calculating, for each vehicle associated with the at least two license plates, a probabilistic street network route based on each sequential piece of timed data and each piece of location data included in the obtained plurality of vehicle data and the received plurality of input data. The method may include identifying a plurality of overlapping routes between the at least two vehicles associated with the at least two license plates based on the calculated probabilistic street network route. The method may include displaying the identified plurality of overlapping routes between the at least two vehicles as a meeting area.

According to yet another embodiment, a computer program product for vehicle convergence analysis based on a plurality of sparse location data is provided. The computer program product may include one or more computer-readable storage devices and program instructions stored on at least one of the one or more tangible storage devices, the program instructions executable by a processor. The computer program product may include program instructions to obtain a plurality of vehicle location data, whereby the received plurality of vehicle data includes a location associated with a vehicle, a license plate text associated with the vehicle, and a date and time of a sighting of the vehicle. The computer program product may also include program instructions to receive a plurality of input data, whereby the plurality of input data includes at least two license plates that are associated with at least two vehicles, whereby each license plate is associated with a different vehicle, an indicated time span on which to run an analysis on the obtained plurality of vehicle location data, and an indicated time difference between an actual route and an estimated route. The computer program product may further include program instructions to calculate, for each vehicle associated with the at least two license plates, a probabilistic street network route based on each sequential piece of timed data and each piece of location data included in the obtained plurality of vehicle data and the received plurality of input data. The computer program product may include program instructions to identify a plurality of overlapping routes between the at least two vehicles associated with the at least two license plates based on the calculated probabilistic street network route. The computer program product may include program instructions to display the identified plurality of overlapping routes between the at least two vehicles as a meeting area.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to sparse data. The following described exemplary embodiments provide a system, method and program product to, among other things, perform vehicle convergence analysis based on sparse location data. Various implementations of the present embodiment include multiple vehicle convergence, historical analysis of routes, and determining the likelihood of vehicles for a given area. Therefore, the present embodiment has the capacity to improve the technical field of sparse data by combining the sparse data obtained today via manual and automatic methods with other methods to obtain positional data on vehicles to analyze the likely routes that a vehicle may have taken. More specifically, the present embodiment provides a method to analyze these routes to determine where two or more vehicles likely met and the time duration of that meeting. Furthermore, a graphical user interface (GUI) may be utilized to assist in the setup and visualization of the results.

As previously described, sparse data may be for example, a sensor recording the temperature and humidity levels, or how often something is used. When the sensor reports that data, it may really be just a small amount of information within the overall structure. However, utilizing sparsely collected information, such as automated license plate reader cameras, both stationary and mobile, may only show a point in time where a vehicle was sighted. Then, if someone wants to further determine where and when two vehicles met, for instance, as part of a police investigation, one would need to combine this sparse data with other information and determine likely areas where the multiple vehicles met.

As such, it may be advantageous, among other things, to provide vehicle convergence analysis based on sparse location data. As such, utilizing the present embodiment described herein may uncover the following non-obvious information, such as the most likely time and place where two or more vehicles stopped together; the places where suspect vehicles tend to stop, thus potentially uncovering information that may be useful to police investigations; and discrepancies in a drive path to indicate abnormal behavior.

Therefore, the benefits to the techniques described herein may be of value to local law enforcement when attempting to investigate crime situations. Additionally, if there is a known crime scene, utilizing the reverse technique described herein may identify suspect vehicles. As such, the present embodiment has the capacity to utilize nearly useless sparse data (if the sparse data is used on its own) and potentially uncover useful non-obvious information.

According to at least one implementation, the present embodiment may combine the sparse data obtained today via manual and automatic methods, such as license plate reader cameras, both fixed and mobile, as well as other methods to obtain positional data on vehicles, such as personal sightings by officers, traffic stops, border patrol, and other security checkpoints, to analyze the likely routes that a vehicle may have taken. Then, the present embodiment offers a method to analyze these routes to determine where two or more vehicles likely met and the time duration of that meeting. Furthermore, a graphical user interface may be utilized to assist in the setup and visualization of the results.

Currently, without the use of the present embodiment, there may be too much data, too sparse in location and time information, to analyze by hand, or even using existing techniques. Sparse information only tells us a point-in-time location of a vehicle, but fails to indicate direction, path, or the convergence of where two or more vehicles may be meeting.

For example, a police officer can 'tail' one of the suspect vehicles in the hopes of catching it in a criminal act, but this can cause the suspect vehicle to alter its route if it is discovered that it is being followed. Additionally, for example, if a known hideout, crime scene, or drug house is found, a police officer would want to know what vehicles have passed by that house to expand their investigation. Since a license plate reader camera will most likely not be in the immediate area, there is no record of vehicles that were in the area at the time of the incident. As such, utilizing the present embodiment may provide an investigator the ability to see potential suspects that may have passed by the area. Therefore, such data may be valuable information that may be the link between solving a case and having it remain an unsolved cold-case, potentially leaving a criminal unprosecuted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product that provides vehicle convergence analysis based on sparse location data. According to at least one implementation, the present embodiment may receive a set of input data identifying locations and times for vehicles whereby $V_iL_k$ at $V_iT_k$ represents the location $L_k$ of the vehicle $V_i$ at the time $T_k$. For each vehicle $V_i$ and each consecutive time $T_k$, $T_{k+1}$ is calculated a set of routes $V_iT_kR$. At least one potential intersection (meeting location) between the vehicles $V_i$ and $V_j$ may be identified based on a time and a routing intersection between the set of routes and successive times. Additionally, weighting factors may be applied to determine the most likely routes selected from a group consisting of, but not limited to, accounting for weather, historical travel time, known meeting places, anomalous time difference, etc. Then, the most likely routes may be utilized to identify at least one potential intersection. Furthermore, a graphical user interface (GUI) may be provided allowing a user to specify information controlling the analysis of information, such as the license plate numbers of vehicles, times, the weighting factors, or other information obtained.

Figure 1:
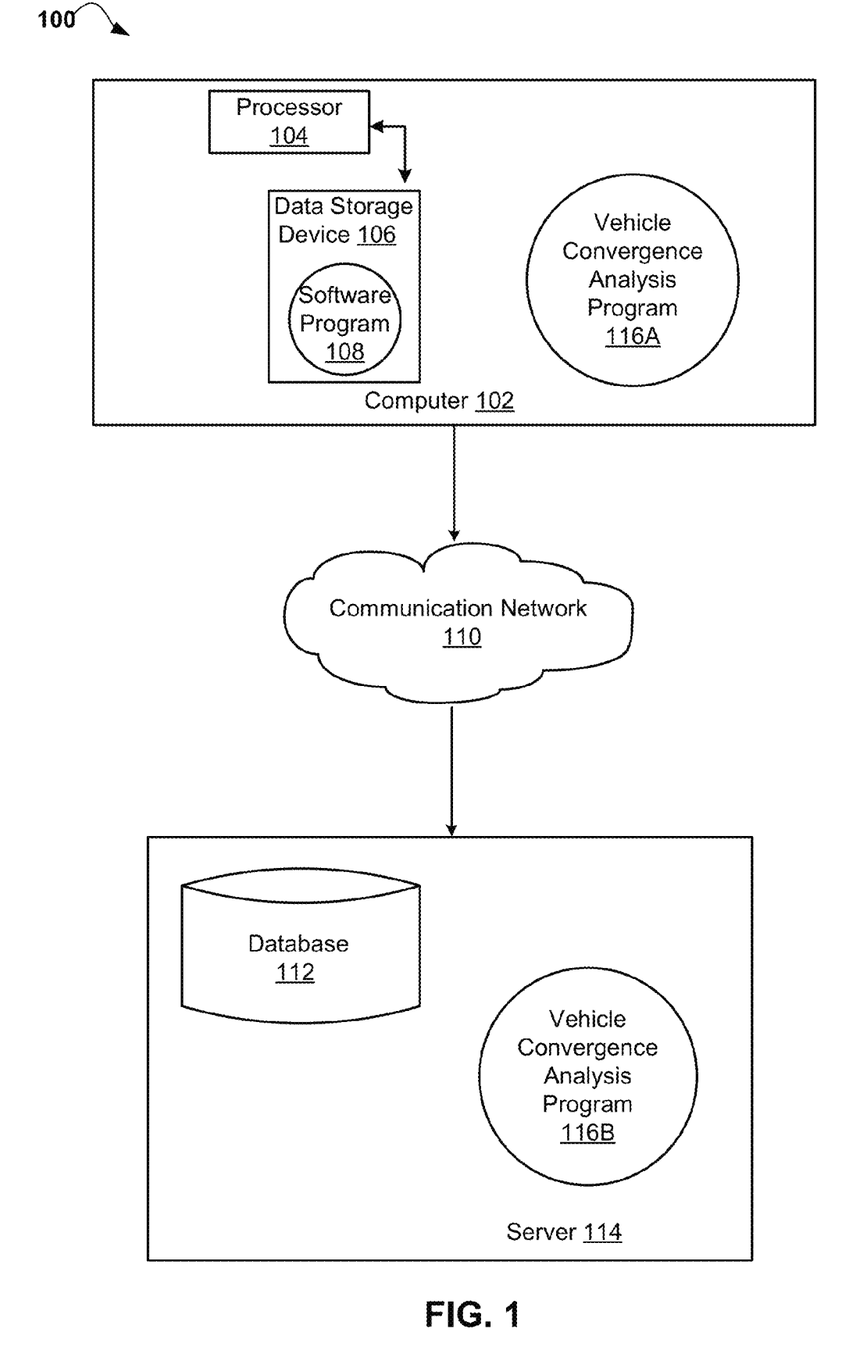
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Vehicle Convergence Analysis Program 116A. The networked computer environment 100 may also include a server 114 that is enabled to run a Vehicle Convergence Analysis Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Vehicle Convergence Analysis Program 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Vehicle Convergence Analysis Program 116A, 116B may interact with a database 112 that may be embedded in various storage devices, such as, but not limited to a computer/mobile device 102, a networked server 114, or a cloud storage service.

As previously described, the client computer 102 may access the Vehicle Convergence Analysis Program 116B, running on server computer 114 via the communications network 110. For example, a user using a client computer 102 may utilize the Vehicle Convergence Analysis Program 116A, 116B to perform vehicle convergence analysis based on sparse location data. According to at least one implementation, the present embodiment may provide historic analysis based on sparse location information for multiple convergence or flag routes as anomalies for later investigation. Furthermore, the present embodiment may reverse the process and determine which vehicles were in an area based on sparse location information. As such, the Vehicle Convergence Analysis Program 116A, 116B may utilize vehicle convergence or routes for analysis. The Vehicle Convergence Analysis method is explained in more detail below with respect to FIGS. 2A-2B.

Figure 2A:
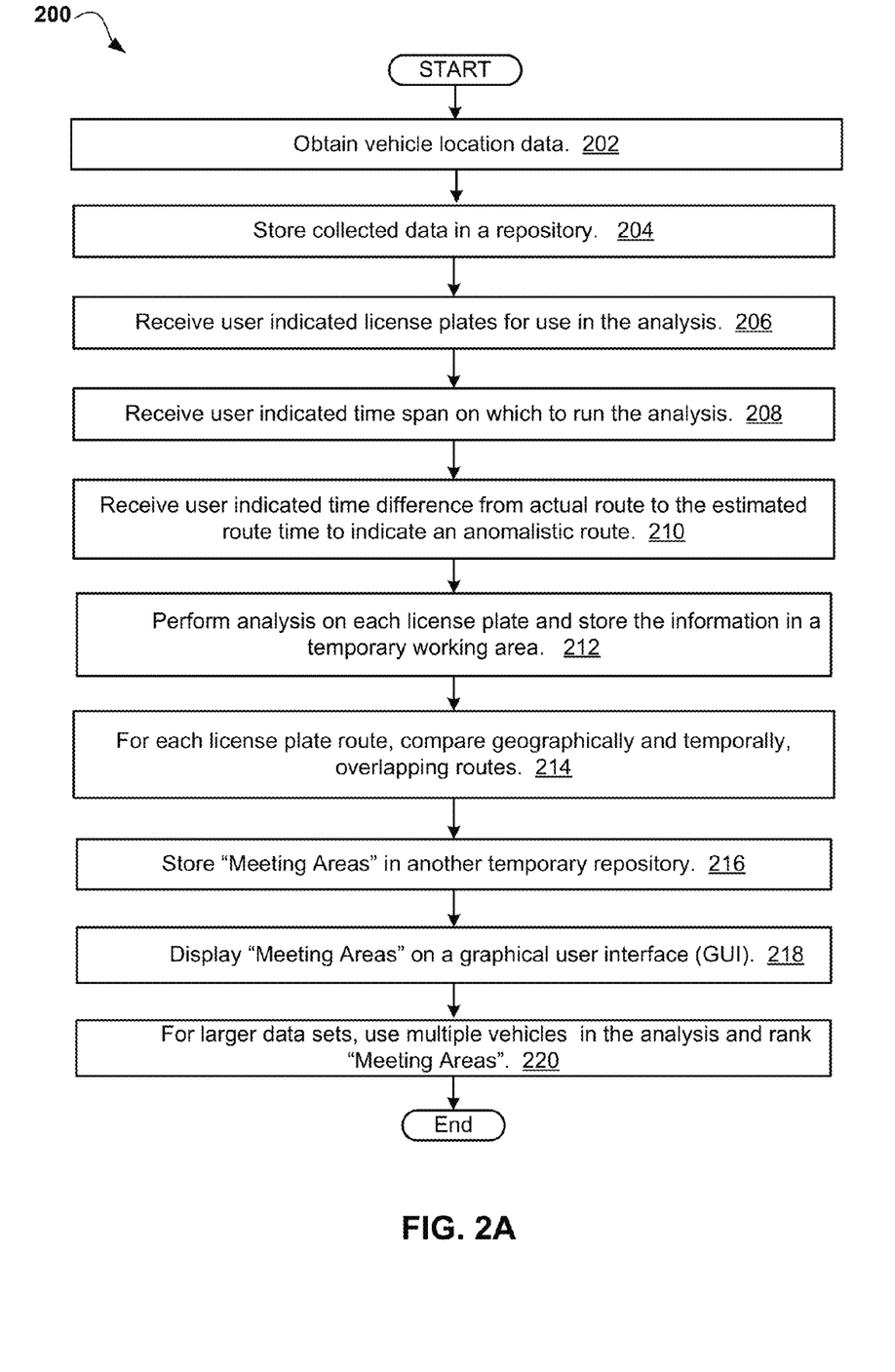
FIGS. 2A-2B are operational flowcharts illustrating the steps carried out by a program that performs vehicle convergence analysis based on sparse location data according to at least one embodiment.
Figure 2B:
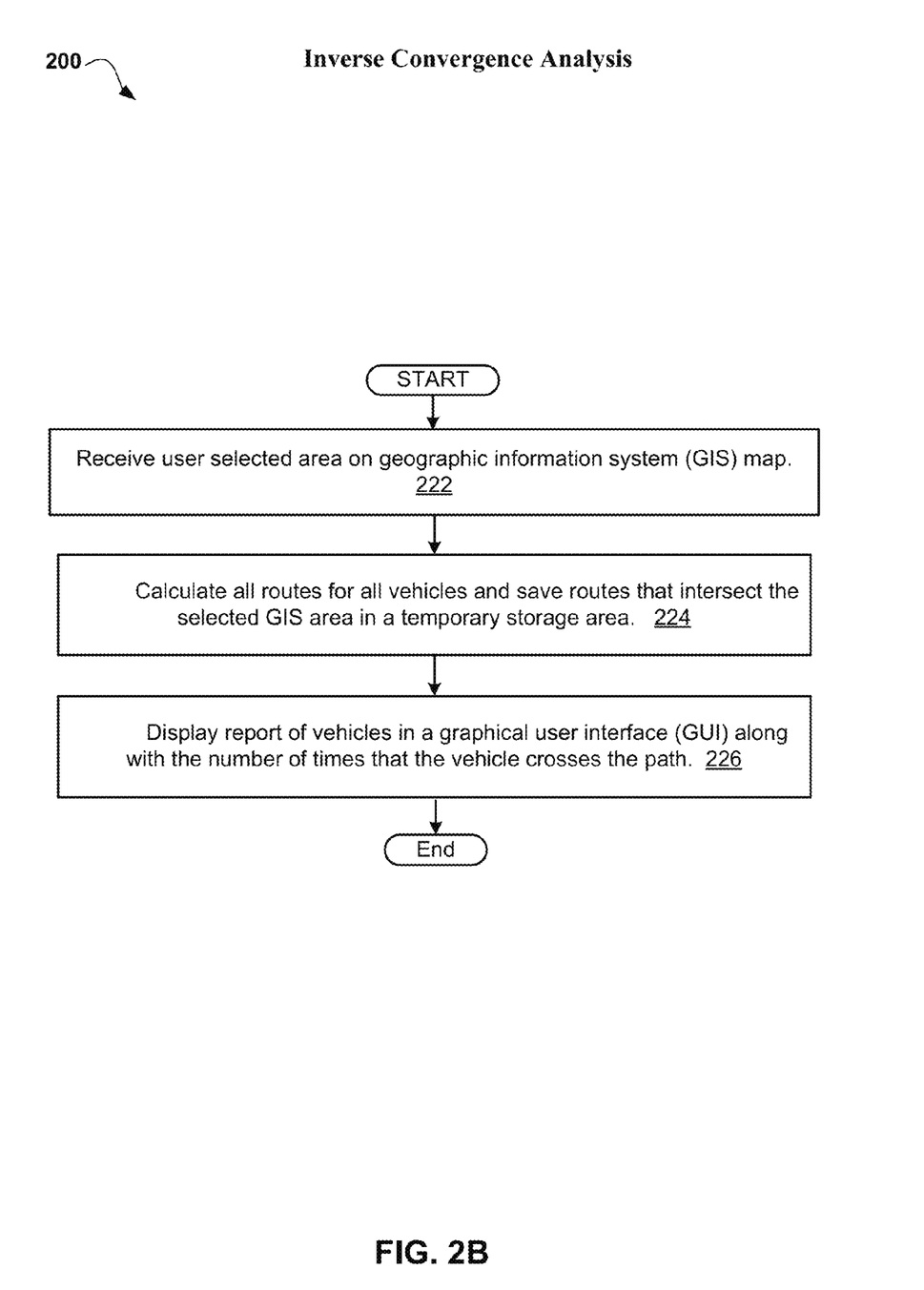

Referring now to FIGS. 2A-2B, operational flowcharts 200 illustrating the steps carried out by a program that performs vehicle convergence analysis based on sparse location data in accordance with one embodiment is depicted. As previously described, the Vehicle Convergence Analysis Program 116A, 116B (FIG. 1) may combine sparse data obtained today via manual and automatic methods, such as license plate reader cameras, both fixed and mobile, as well as other methods to obtain positional data on vehicles, such as personal sightings by officers, traffic stops, border patrol, and other security checkpoints, to analyze the likely routes that a vehicle may have taken. Then, the present embodiment offers a method to analyze these routes to determine where two or more vehicles likely met and the time duration of that meeting. Furthermore, a graphical user interface (GUI) may be utilized to assist in the setup and visualization of the results.

Therefore, with respect to FIG. 2A, at 202, the Vehicle Convergence Analysis Program 116A, 116B (FIG. 1) obtains vehicle location data. According to at least one implementation, the vehicle location data may be obtained via the use of automatic cameras, such as license plate readers (LPR), or manually collected by observations, such as by police officers, traffic stops, etc. The data obtained includes, but is not limited to a location (such as latitude/longitude), the vehicle license plate text, and the date and time of the sighting of the vehicle.

Then at 204, the Vehicle Convergence Analysis Program 116A, 116B (FIG. 1) stores the collected data in a repository. For example, the collected data may be stored in a repository, such as a relational database 112 (FIG. 1).

Next at 206, the Vehicle Convergence Analysis Program 116A, 116B (FIG. 1) receives user indicated license plates that will be used in the convergence analysis. As such, a user may indicate, via a GUI, two or more license plates for use in the convergence analysis.

Then at 208, the Vehicle Convergence Analysis Program 116A, 116B (FIG. 1) receives a user indicated time span on which to run the convergence analysis. Therefore, a user may indicated, via a GUI, a time span on which to run the analysis.

Next at 210, the Vehicle Convergence Analysis Program 116A, 116B (FIG. 1) receives a user indicated time difference from the actual route to the estimated route time to indicate an anomalistic route (i.e., a departure from the normal or common route). Therefore, according to at least one implementation, a user may indicate, via a GUI, a time, in minutes or a percentage, which is the difference from the actual route to the estimated route time to indicate an anomalistic route.

Then at 212, the Vehicle Convergence Analysis Program 116A, 116B (FIG. 1) performs analysis on each license plate and stores the analysis information in a temporary working area. For example, the Vehicle Convergence Analysis Program 116A, 116B (FIG. 1) may take each vehicle license plate in turn and perform analysis, and store the information in a temporary working area, such as a database 112 (FIG. 1) or an index. The analysis performed on may include the following:

a. Order the data by date and time.
b. Between each sequential piece of time and place data, the most likely street network route is calculated. This may be accomplished using existing routing software from vendors such as GOOGLE® (GOOGLE® and all GOOGLE®-based trademarks and logos are trademarks or registered trademarks of GOOGLE INC. and/or its affiliates), GPS software, etc.
c. Store the route in the temporary working area along with the start and end times for that route.
d. If there are multiple routes which meet the start/end point criteria, those may also be stored with an indicator that these are alternate routes.
e. If the estimated route time is significantly less than the actual time, flag the route segment as a discrepancy (anomalistic).
  i. Historical traffic congestion can be factored in to eliminate valid discrepancies.

ii. Construction or other events, such as weather or time of day are also factors which may be considered as they may affect vehicle route time.

Next at 214, for each license plate route, the Vehicle Convergence Analysis Program 116A, 116B (FIG. 1) compares geographically and temporally overlapping routes. According to at least one implementation, once the initial analysis has been performed, for each license plate route, the Vehicle Convergence Analysis Program 116A, 116B (FIG. 1) may compare geographically and temporally, overlapping routes, such that if two vehicles crossed paths, and both vehicles are flagged as a discrepancy, and the times overlapped, this is may be determined to be a potential meeting area.

Then at 216, the Vehicle Convergence Analysis Program 116A, 116B (FIG. 1) stores the "meeting areas" in another temporary processing area. For example, the "meeting areas" that were determined based on the previously described analysis may be stored in a temporary repository, such as a database 112 (FIG. 1).

Next at 218, the Vehicle Convergence Analysis Program 116A, 116B (FIG. 1) displays the "meeting areas" on a GUI. Therefore, once the convergence analysis is complete, the Vehicle Convergence Analysis Program 116A, 116B (FIG. 1) may display the "meeting areas" on a graphical user interface (GUI), utilizing a geographical map, along with the timeframes where they overlapped, and the license plates involved.

Then at 220, for larger data sets, the Vehicle Convergence Analysis Program 116A, 116B (FIG. 1) uses multiple vehicles in the convergence analysis and ranks the "meeting areas". According to at least one implementation, for larger data sets, multiple vehicles may be used in the convergence analysis and the "meeting areas" may be ranked according to number of vehicles which overlapped and/or the number of times that a "meeting area" was discovered by the algorithm. As such, this may depict the likely meeting places for larger organizations. Additionally, knowledge about the surrounding area may also be factored in, such as known apartments or warehouses in the area and may be indicated to the user as potential sites.

Referring now to FIG. 2B, an operational flowchart 200 illustrating the steps for inverse convergence analysis is depicted. According to at least one implementation of the present embodiment, the inverse of the algorithm previously described with respect to FIG. 2A may also be utilized to depict which vehicles typically go into certain areas. The algorithm depicted in FIG. 2B would be essentially the reverse of the algorithm described with respect to FIG. 2A above.

Therefore, at 222, the Vehicle Convergence Analysis Program 116A, 116B (FIG. 1) receives a user selected area on a geographic information (GIS) map. Therefore, a user may select, via a GUI, an area on a GIS map.

Then at 224, the Vehicle Convergence Analysis Program 116A, 116B (FIG. 1) calculates all routes for all vehicles and saves the routes that intersect the selected GIS area in a temporary storage area. For example, all routes for all vehicles may be calculated and the routes ones that intersect the selected GIS area may be saved in the temporary repository, such as database 112 (FIG. 1).

Next at 226, the Vehicle Convergence Analysis Program 116A, 116B (FIG. 1) displays a report of vehicles, along with the number of times that vehicle crosses the path. According to at least one implementation, the report of vehicles and the number of times that vehicle crosses the path may be displayed to the user in a graphical user interface.

It may be appreciated that FIGS. 2A-2B provide only an illustration of one implementation and does not imply any limitations with regard to how different embodiments may be implemented. Many modifications to the depicted environments may be made based on design and implementation requirements. For example, according to at least one implementation of the present embodiment, routes can be stored in a relational database table, where the route shape is a geographic data type. Intersection of routes can be accomplished via a SQL Query, where the shapes INTERSECT. Most relational databases which support a geography data type have an intersect function which returns the point(s) at which two geographic shapes intersect.

Additionally, existing technology algorithms may utilized to compute the probability distribution of travel times using sparse data to implement an alternate embodiment that determines an alternate route in lieu of traffic. As such, a probabilistic model may be used to consider multiple paths in the analysis and to calculate alternate routes due to traffic congestion.

Similarly, output from existing technology algorithms may be used to calculate routes and travel times and a neural network may be applied to the algorithm of the present embodiment to assist in determining routes and outliers. A neural network is a system of programs and data structures that approximates the operation of the human brain. A neural network typically involves a large number of processors operating in parallel, each with its own small sphere of knowledge and access to data in its local memory.

Implementations of the present embodiment may teach multiple vehicle convergence (i.e., meetings) and utilize observed locations or external observations via existing technology, such as, but not limited to automatic license plate cameras or police observations. Furthermore, the present embodiment may process historical reads for correlations and determine anomalous routing. Additionally, as previously explained, the present embodiment encompasses a reverse process to determine which vehicles were likely to be in an area at a certain time.

Figure 3A:
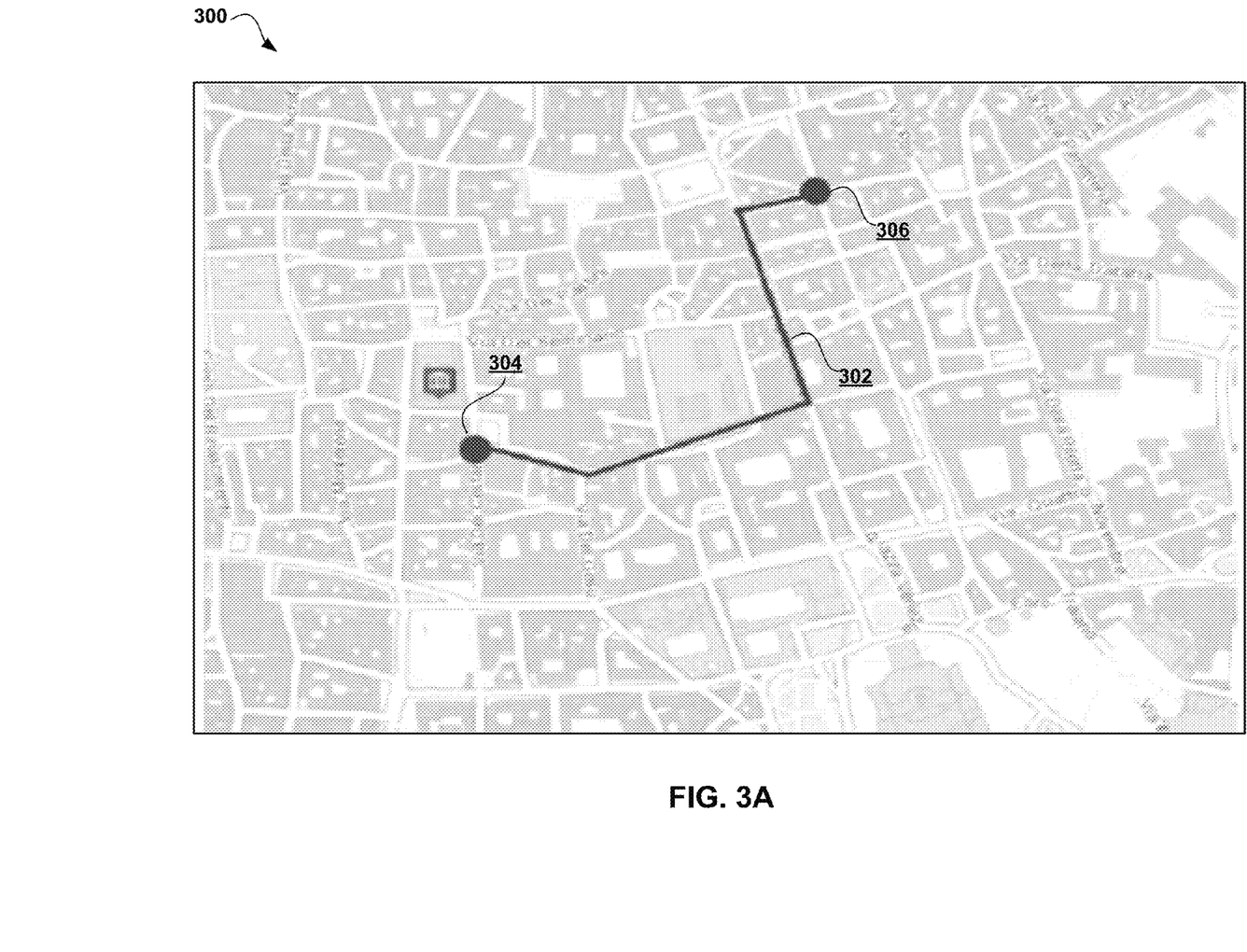
FIGS. 3A-3B are exemplary maps depicting vehicle convergence analysis according to at least one embodiment.
Figure 3B:
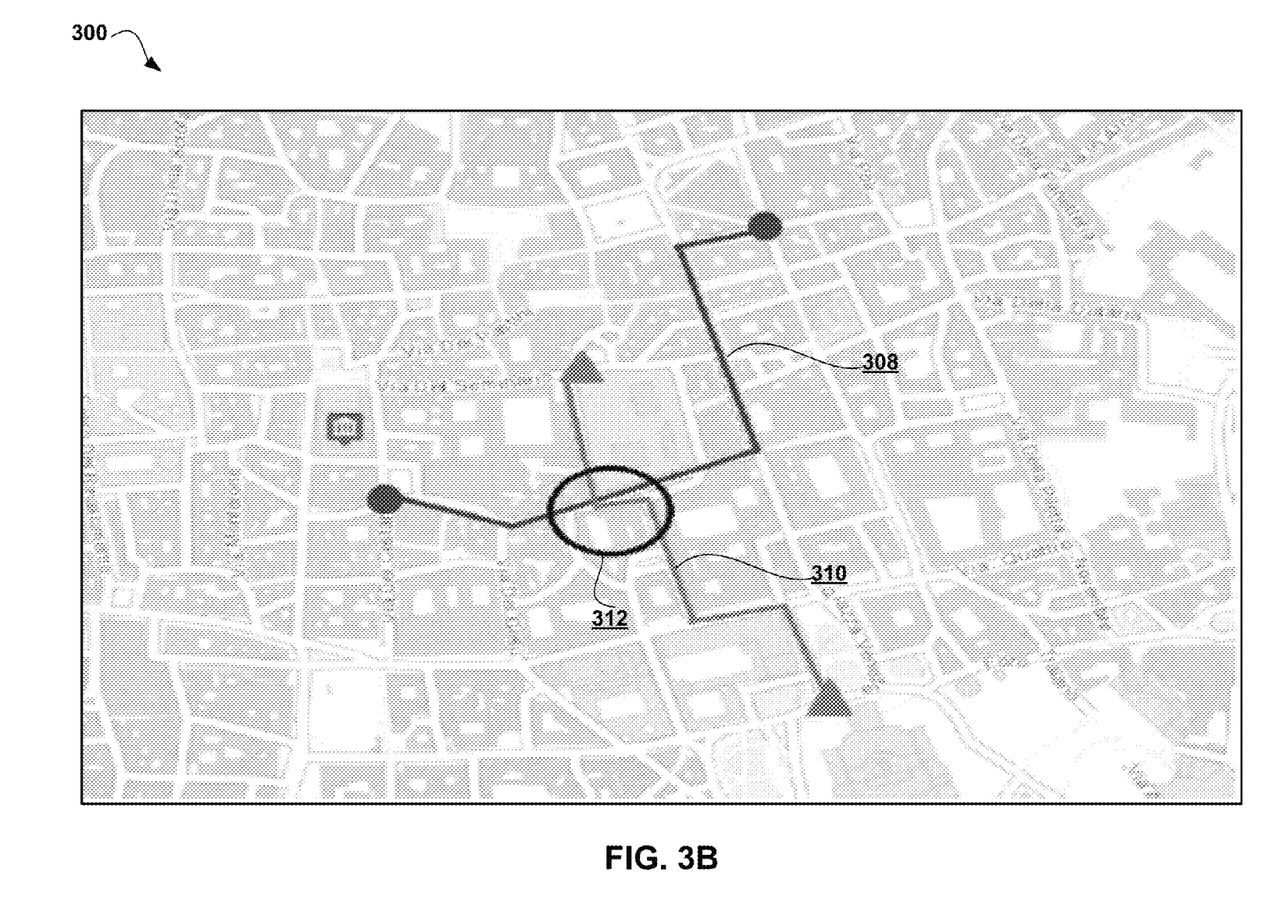

Referring now to FIGS. 3A-3B, exemplary maps 300 depicting vehicle convergence analysis in accordance with one embodiment is depicted. With respect to FIG. 3A, the Vehicle Convergence Analysis Program 116A, 116B (FIG. 1) may calculate the most likely street network route 302 based on each pair of temporally sequential license plate reads. If the time between data points 304, 306 is greater than the estimated route time (with traffic and construction factored in), the Vehicle Convergence Analysis Program 116A, 116B (FIG. 1) may flag the route as anomalistic. Additionally, the present embodiment may include a human-user input to allow for a certain percentage difference or number of minutes difference to flag a route as anomalistic.

With respect to FIG. 3B, for each pair of overlapping routes, the Vehicle Convergence Analysis Program 116A, 116B (FIG. 1) may calculate the overlapping area 312 (i.e., the place where the two routes 308, 310 overlap). As such, the overlap of the route of vehicle 1 308 and the route of vehicle 2 310 is depicted by the circle 312. According to at least one implementation of the present embodiment, the start and end time of the two paths 308, 310 overlap, and they both have been flagged as outside the normal duration to complete the path. Therefore, the area in the circle 312 is considered a potential 'meeting area' for the two vehicles.

Figure 4:
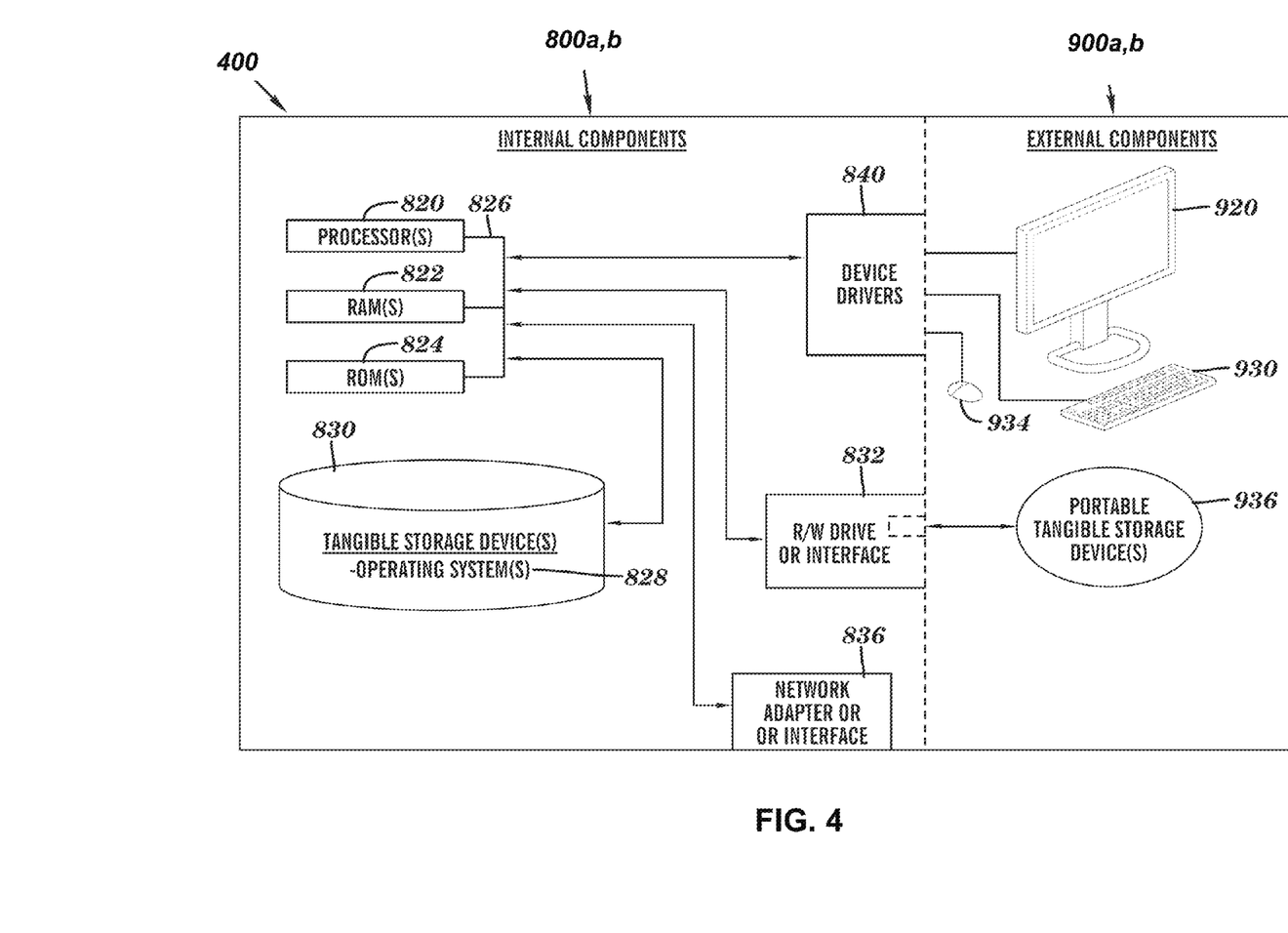
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Vehicle Convergence Analysis Program 116A (FIG. 1) in client computer 102 (FIG. 1) and the Vehicle Convergence Analysis Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Vehicle Convergence Analysis Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Vehicle Convergence Analysis Program 116A (FIG. 1) in client computer 102 (FIG. 1) and the Vehicle Convergence Analysis Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Vehicle Convergence Analysis Program 116A (FIG. 1) in client computer 102 (FIG. 1) and the Vehicle Convergence Analysis Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
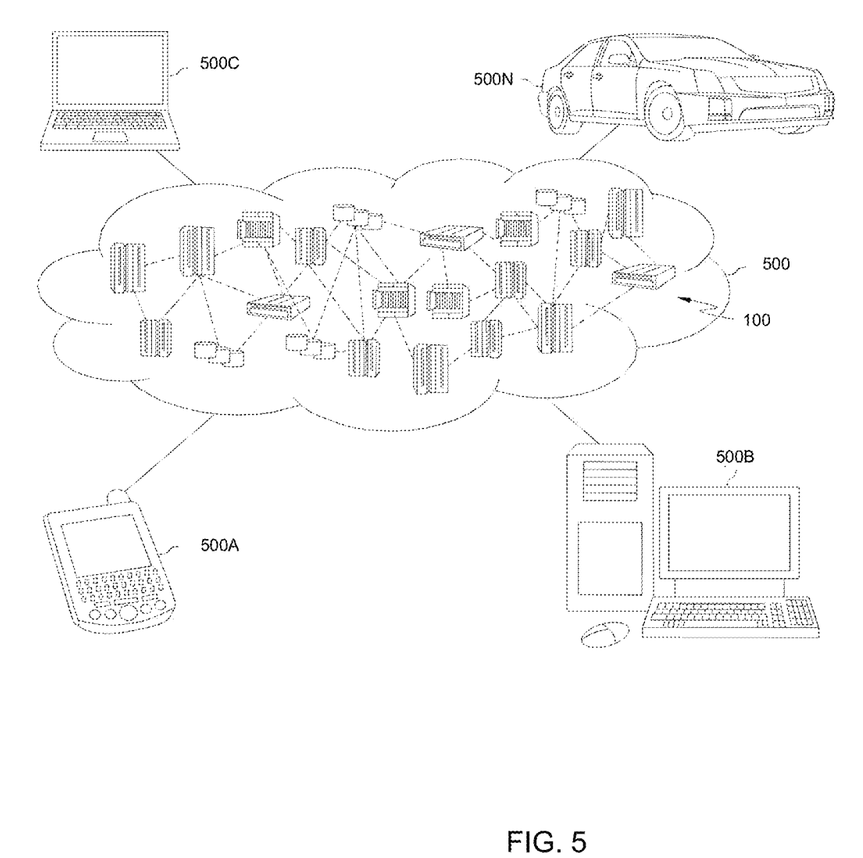
FIG. 5 is a block diagram of an illustrative cloud computing environment including the computer system depicted in FIG. 1, according to at least one embodiment.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
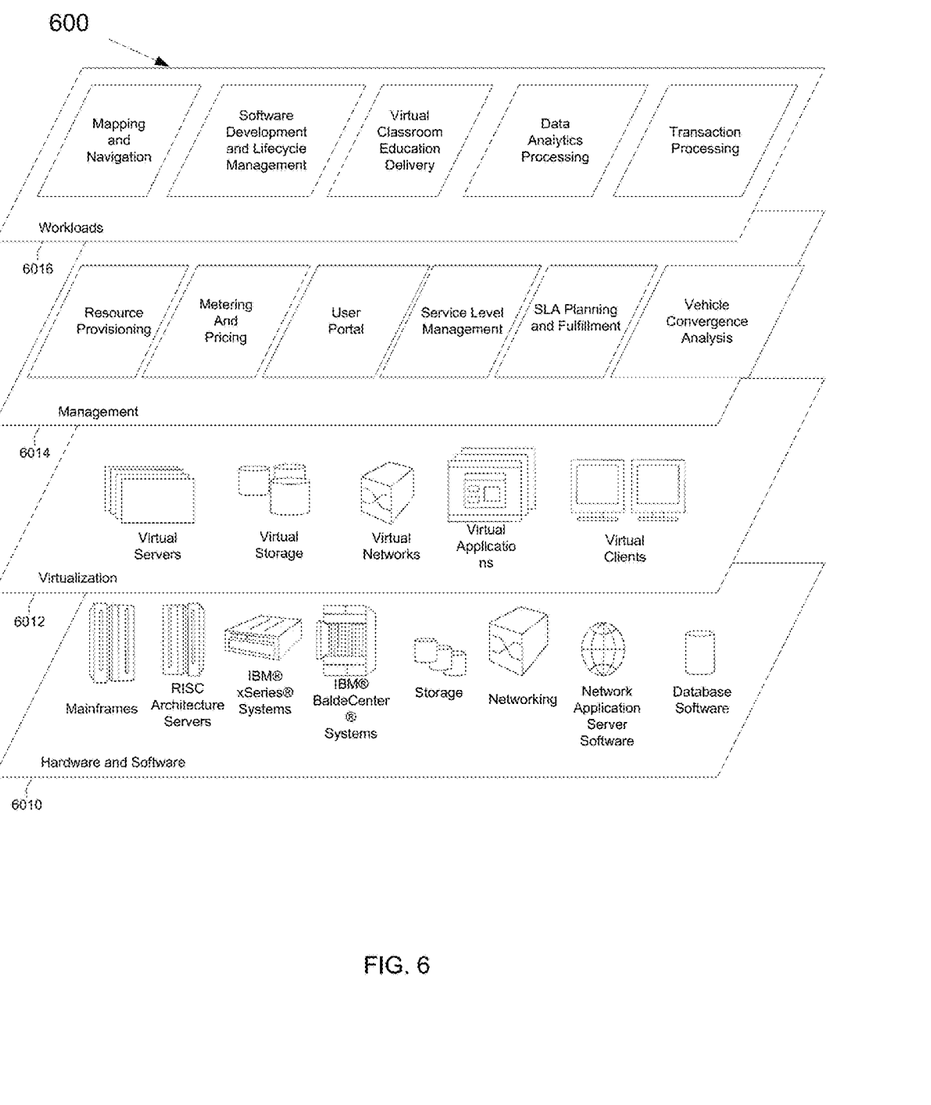
FIG. 6 is a block diagram of functional layers of the illustrative cloud computing environment of FIG. 5, according to at least one embodiment.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Vehicle Convergence Analysis Program may provide vehicle convergence analysis based on sparse location data.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for vehicle convergence analysis based on a plurality of sparse location data, the method comprising:
   obtaining, by a processor from a plurality of cameras located throughout a geographic space, a plurality of vehicle location data, wherein the received plurality of vehicle data includes a location associated with a vehicle, a license plate text associated with the vehicle, and a date and time of a sighting of the vehicle;
   receiving a plurality of input data, wherein the plurality of input data includes a first license plate corresponding to a first vehicle and a second license plate corresponding to a second vehicle, and an indicated time span on which to run an analysis on the obtained plurality of vehicle location data;
   determining, for the first vehicle, a first street network route based on the indicated time span and location data included in the obtained plurality of vehicle data and the received plurality of input data;
   determining, for the second vehicle, a second street network route based on the indicated time span and based on location data included in the obtained plurality of vehicle data and the received plurality of input data;
   identifying a plurality of overlapping routes between the first street network route of the first vehicle and the second street network route of the second vehicle, wherein the plurality of overlapping routes correspond to at least one portion of the first street network route of the first vehicle overlapping with at least one portion of the second street network route of the second vehicle;
   determining, for at least one overlapping route in the plurality of overlapping routes, an expected time period for the first vehicle and the second vehicles to travel through the at least one overlapping route;
   determining, for each one of the at least one overlapping route, an actual travel time period for the first vehicle and the second vehicle based on the plurality of vehicle location data and the plurality of input data associated with the vehicle;
   determining, for each one of the at least one overlapping route, an estimated travel time period for the first vehicle and the second vehicle based on the plurality of vehicle location data and the plurality of input data associated with the vehicle;
   identifying the at least one overlapping route for displaying based on the actual travel time period exceeding the estimated time period by more than a threshold value; and
   displaying the identified plurality of overlapping routes, including the at least one overlapping route, between the first vehicle and the second vehicle with a potential meeting area, wherein the potential meeting area is depicted by a geographic area where the first vehicle and the second vehicle crossed paths at an overlapping time.

2. The method of claim 1, further comprising:
   storing the obtained plurality of vehicle location data in a repository.

3. The method of claim 1, wherein the obtained plurality of vehicle location data is obtained automatically or manually.

4. The method of claim 1, wherein the displayed identified plurality of overlapping routes as the potential meeting area is displayed via a graphical user interface (GUI).

5. The method of claim 1, wherein the displayed identified plurality of overlapping routes includes displaying at least one of a geographical map, a plurality of timeframes associated with when at least two routes overlapped, and the received at least two license plates within the plurality of input data.

6. The method of claim 1, further comprising:
   applying weighting factors to determine a plurality of most likely routes, wherein the weighting factors are selected from a group including an accounting for weather, a plurality of historical travel time, a plurality of known meeting places, and an anomalous time difference; and
   utilizing the determined plurality of most likely routes to identify at least one potential intersection.

7. The method of claim 1, wherein the received input data further comprises:
   providing a graphical user interface (GUI) allowing a user to specify a plurality of information used to control the analysis of the obtained vehicle location data.

8. The method of claim 1 further comprising:
   receiving a selected area on a geographic information (GIS) map;
   calculating a plurality of routes for a plurality of vehicles;
   storing each calculated route within the plurality of routes that intersect the selected GIS area in a temporary storage area; and
   displaying a report comprising a plurality of vehicles associated with the calculated plurality of routes that intersect the selected GIS and a number of times each vehicle within the plurality of vehicles crosses a route within the plurality of routes that intersect the selected GIS.

9. A computer system for vehicle convergence analysis based on a plurality of sparse location data, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   obtaining, by a processor from a plurality of cameras located throughout a geographic space, a plurality of vehicle location data, wherein the received plurality of vehicle data includes a location associated with a vehicle, a license plate text associated with the vehicle, and a date and time of a sighting of the vehicle;
   receiving a plurality of input data, wherein the plurality of input data includes a first license plate corresponding to a first vehicle and a second license plate corresponding to a second vehicle, and an indicated time span on which to run an analysis on the obtained plurality of vehicle location data;
   determining, for the first vehicle, a first street network route based on the indicated time span and location data included in the obtained plurality of vehicle data and the received plurality of input data;
   determining, for the second vehicle, a second street network route based on the indicated time span and based on location data included in the obtained plurality of vehicle data and the received plurality of input data;

identifying a plurality of overlapping routes between the first street network route of the first vehicle and the second street network route of the second vehicle, wherein the plurality of overlapping routes correspond to at least one portion of the first street network route of the first vehicle overlapping with at least one portion of the second street network route of the second vehicle;

determining, for at least one overlapping route in the plurality of overlapping routes, an expected time period for the first vehicle and the second vehicles to travel through the at least one overlapping route;

determining, for each one of the at least one overlapping route, an actual travel time period for the first vehicle and the second vehicle based on the plurality of vehicle location data and the plurality of input data associated with the vehicle;

determining, for each one of the at least one overlapping route, an estimated travel time period for the first vehicle and the second vehicle based on the plurality of vehicle location data and the plurality of input data associated with the vehicle;

identifying the at least one overlapping route for displaying based on the actual travel time period exceeding the estimated time period by more than a threshold value; and displaying the identified plurality of overlapping routes, including the at least one overlapping route, between the first vehicle and the second vehicle with a potential meeting area, wherein the potential meeting area is depicted by a geographic area where the first vehicle and the second vehicle crossed paths at an overlapping time.

10. The computer system of claim 9, further comprising: storing the obtained plurality of vehicle location data in a repository.

11. The computer system of claim 9, wherein the obtained plurality of vehicle location data is obtained automatically or manually.

12. The computer system of claim 9, wherein the displayed identified plurality of overlapping routes as the potential meeting area is displayed via a graphical user interface (GUI).

13. The computer system of claim 9, wherein the displayed identified plurality of overlapping routes includes displaying at least one of a geographical map, a plurality of timeframes associated with when at least two routes overlapped, and the received at least two license plates within the plurality of input data.

14. The computer system of claim 9, further comprising: applying weighting factors to determine a plurality of most likely routes, wherein the weighting factors are selected from a group including an accounting for weather, a plurality of historical travel time, a plurality of known meeting places, and an anomalous time difference; and utilizing the determined plurality of most likely routes to identify at least one potential intersection.

15. The computer system of claim 9, wherein the received input data further comprises:

providing a graphical user interface (GUI) allowing a user to specify a plurality of information used to control the analysis of the obtained vehicle location data.

16. The computer system of claim 9 further comprising: receiving a selected area on a geographic information (GIS) map;

calculating a plurality of routes for a plurality of vehicles;

storing each calculated route within the plurality of routes that intersect the selected GIS area in a temporary storage area; and displaying a report comprising a plurality of vehicles associated with the calculated plurality of routes that intersect the selected GIS and a number of times each vehicle within the plurality of vehicles crosses a route within the plurality of routes that intersect the selected GIS.

17. A computer program product for vehicle convergence analysis based on a plurality of sparse location data, the computer program product comprising:

one or more computer-readable storage devices and program instructions stored on at least one of the one or more tangible storage devices, the program instructions executable by a processor, the program instructions comprising:

program instructions to obtain, by a processor from a plurality of cameras located throughout a geographic space, a plurality of vehicle location data, wherein the received plurality of vehicle data includes a location associated with a vehicle, a license plate text associated with the vehicle, and a date and time of a sighting of the vehicle;

program instructions to receive a plurality of input data, wherein the plurality of input data includes a first license plate corresponding to a first vehicle and a second license plate corresponding to a second vehicle, and an indicated time span on which to run an analysis on the obtained plurality of vehicle location data;

program instructions to determine, for the first vehicle, a first street network route based on the indicated time span and location data included in the obtained plurality of vehicle data and the received plurality of input data;

program instructions to determine, for the second vehicle, a second street network route based on the indicated time span and based on location data included in the obtained plurality of vehicle data and the received plurality of input data;

program instructions to identify a plurality of overlapping routes between the first street network route of the first vehicle and the second street network route of the second vehicle, wherein the plurality of overlapping routes correspond to at least one portion of the first street network route of the first vehicle overlapping with at least one portion of the second street network route of the second vehicle;

program instructions to determine, for at least one overlapping route in the plurality of overlapping routes, an expected time period for the first vehicle and the second vehicles to travel through the at least one overlapping route;

program instructions to determine, for each one of the at least one overlapping route, an actual travel time period for the first vehicle and the second vehicle based on the plurality of vehicle location data and the plurality of input data associated with the vehicle;

program instructions to determine, for each one of the at least one overlapping route, an estimated travel time period for the first vehicle and the second vehicle based on the plurality of vehicle location data and the plurality of input data associated with the vehicle;

program instructions to identify the at least one overlapping route for displaying based on the actual travel time period exceeding the estimated time period by more than a threshold value; and program instructions to display the identified plurality of overlapping routes, including the at least one overlapping route, between the first vehicle and the second vehicle with a potential meeting area, wherein the potential meeting area is depicted by a geographic area where the first vehicle and the second vehicle crossed paths at an overlapping time.

18. The computer program product of claim 17, further comprising:
   program instructions to store the obtained plurality of vehicle location data in a repository.

19. The computer program product of claim 17, wherein the obtained plurality of vehicle location data is obtained automatically or manually.

20. The computer program product of claim 17, wherein the displayed identified plurality of overlapping routes as the potential meeting area is displayed via a graphical user interface (GUI).

* * * * *